G. R. BINGHAM.
Improvement in High Wine Cisterns to Prevent Fraud on the Revenue.
No. 123,668.  Patented Feb. 13, 1872.
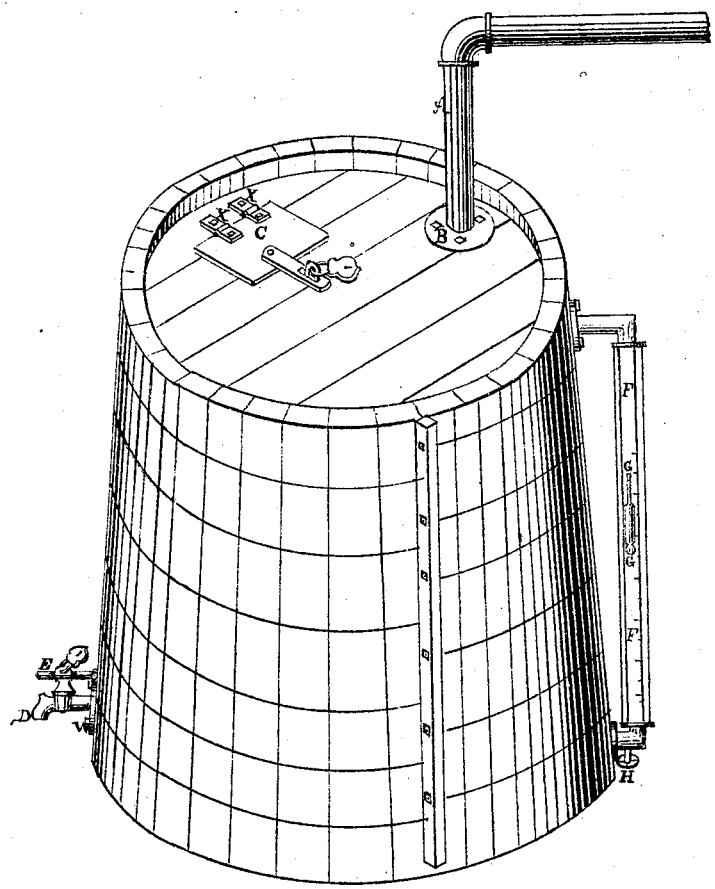
Attest.
Philip M. Shurig
J. Tavohig
Inventor.
Gordon B. Bingham,
per Fisher and Fisher,
Attorneys.

123,668

UNITED STATES PATENT OFFICE.

GORDON B. BINGHAM, OF PATOKA, INDIANA.

IMPROVEMENT IN HIGH-WINE CISTERNS FOR PREVENTING FRAUD ON THE REVENUE.

Specification forming part of Letters Patent No. 123,668, dated February 13, 1872.

I, GORDON B. BINGHAM, of the city of Patoka, in the county of Gibson and State of Indiana, have invented a certain new and useful Improvement in High-Wine Cisterns, of which the following is a specification:

To secure spirits against illicit removal it has been required of the distiller to construct a cistern-room which is kept under lock and key by the Government, and in this cistern-room is placed an open high-wine cistern or upright tank, into which the distilled spirits are conducted by means of a pipe, and are drawn off through a faucet at its bottom.

It has been the duty of the United States gauger to keep the key to this cistern-room; and to ascertain the quantity and proof of the spirits within the tank, he was compelled to draw it off without any prior knowledge of what it contained, or the proof of it, so that access having been gained to the cistern in the absence of the officer in charge, a fraudulent removal of the spirits was easily perpetrated, and almost impossible to detect afterwards.

The object of my invention is to construct a high-wine cistern provided with an easy means of determining, at all times, the exact proof and quantity of the spirits within the tank.

To accomplish this, I construct a closed tank having in the top a man-hole for entrance into the tank. This is closed by a strong door secured by a Government seal-lock. The hinges of this door are bolted down, and the bolts are made fast on the inside. A faucet or discharge-cock is attached to the lower part of the tank, with bolts whose nuts are on the inside of the tank. A slotted drop is hinged at one end, to tank, with bolts secured on the inside, and is located just above this faucet, so as to drop down over the handle of the faucet where it may be secured with a Government seal-lock.

The quantity of spirits within the tank is indicated by a transparent tube, having connection with the high-wines at the top and bottom of the tank, and having a graduated scale divided into barrels and half-barrels marked upon it. An hydrometer is placed within this tube to indicate the proof of the high-wines or spirits within the tank, and in connection with the graduated scale, enables the Government officer, at all times, to ascertain the exact proof and quantity of liquid within, and thereby to detect a fraudulent removal, even if the tank be left open. This tube is protected by a number of iron rods running parallel with the tube from top to bottom. The spirits are conducted into the tank through a continuous pipe, connecting with the high-wine pump, and secured to the tank by a flange bolted down to the tank, the nuts of the bolts being on the inside.

The accompanying drawing which forms a part of this specification, shows a tank as above described.

A is the continuous pipe connecting with the high-wine pump. B is the flange on this pipe bolted to the tank, as above described. C is the door of the man-hole, having its hinges $x\,x$ bolted to the tank, the nuts being inside. D is the discharge-cock on which is the flange W, bolted to the side of the tank with bolts made fast from within. E is the slotted drop hinged to the tank so as to drop over the handle of the discharge-cock D. F is the tube on which is a graduated scale marked to indicate barrels and half-barrels. G is the hydrometer placed into the spirits within the tube F, to indicate the proof of the spirits. H is a valve in the lower elbow of the tube to shut off the flow of the spirits in case the tube should be broken.

What I claim as new, and desire to secure by Letters Patent, is—

1. A locked high-wine cistern provided with the sealed hydrometer tube F, and valve H, substantially as described.

2. The combination of discharge-cock D, and slotted drop E, with a high-wine cistern, substantially as and for the purposes specified.

GORDON B. BINGHAM.

Witnesses:
W. AUSTIN GOODMAN,
P. M. SHUEY.